United States Patent [19]

Anderson et al.

[11] Patent Number: 5,832,227
[45] Date of Patent: Nov. 3, 1998

[54] METHOD FOR PROVIDING MESSAGE DOCUMENT SECURITY BY DELETING PREDETERMINED HEADER PORTIONS AND ATTACHING PREDETERMINED HEADER PORTIONS WHEN SEAL IS VALIDLY ASSOCIATED WITH MESSAGE OR DOCUMENT

[75] Inventors: Mark Stephen Anderson; John Desborough Yesberg; Michael Pope; Lisa Nayda; Ken Hayman; Brendan Beahan, all of Salisbury, Australia

[73] Assignee: The Commonwealth of Australia of Anzak Park, Canberra, Australia

[21] Appl. No.: 481,398

[22] PCT Filed: Dec. 14, 1993

[86] PCT No.: PCT/AU93/00644

§ 371 Date: Aug. 18, 1995

§ 102(e) Date: Aug. 18, 1995

[87] PCT Pub. No.: WO94/14258

PCT Pub. Date: Jun. 23, 1994

[30] Foreign Application Priority Data

Dec. 14, 1992 [AU] Australia .................. PL 6312

[51] Int. Cl.[6] ............... G06F 13/14; G06F 13/20; H04L 9/00
[52] U.S. Cl. ............... 395/200.54; 395/186; 395/187.01; 380/23; 380/25
[58] Field of Search ............... 395/186, 187.01, 395/200.06, 200.54; 380/25, 23

[56] References Cited

U.S. PATENT DOCUMENTS

| | | | |
|---|---|---|---|
| 4,919,545 | 4/1990 | Yu | 380/25 |
| 5,001,755 | 3/1991 | Skret | 380/46 |
| 5,204,961 | 4/1993 | Barlow | 395/725 |
| 5,226,079 | 7/1993 | Holloway | 380/25 |
| 5,369,707 | 11/1994 | Follendore, III | 380/25 |
| 5,550,984 | 8/1996 | Gelb | 395/200.17 |
| 5,577,209 | 11/1996 | Boyle et al. | 395/200.06 |

FOREIGN PATENT DOCUMENTS

| | | | |
|---|---|---|---|
| 0214609 | 8/1987 | European Pat. Off. | H04L 9/00 |
| 3-186030 | 8/1991 | Japan | H04K 1/00 |

Primary Examiner—Thomas C. Lee
Assistant Examiner—Rehana Perveen
Attorney, Agent, or Firm—Baker & Maxham

[57] ABSTRACT

The disclosure of the current invention describes a method of handling a message or a document to be released external of a secure computer environment. The message or the document is first directed to a trusted sealing device which displays the message or the document to a human user for visual checking. If the message or document is acceptable to the human user, the method associates the message or the document with a seal produced by the trusted sealing device. The message or the document is then directed along with the associated seal to a gateway which deletes portions of the header and checks the validity of the associated seal. If, as a result of this verification, it is determined that the associated seal is validly associated with the message or the document, the method attaches predetermined header portions to the message or document and communicates the message or the document from the secure computer environment.

12 Claims, 4 Drawing Sheets

5,832,227

METHOD FOR PROVIDING MESSAGE DOCUMENT SECURITY BY DELETING PREDETERMINED HEADER PORTIONS AND ATTACHING PREDETERMINED HEADER PORTIONS WHEN SEAL IS VALIDLY ASSOCIATED WITH MESSAGE OR DOCUMENT

This application is a 371 of PCT/AU93/00644 filed on Dec. 14, 1993.

This invention relates to the security of computer documents and in particular to electronic mail, and to a method to control the degree to which the presence of covert information may be reduced or eliminated in electronic mail and other electronic documents before they are released from a secure computer environment. Furthermore this specification is directed to the disclosure of the processes conducted with secure computer environments incorporating trusted devices which are used to seal such documents.

BACKGROUND

There exists a need for persons who work on secure computer networks, which are normally physically and electronically isolated from other networks, to be able to transmit low level security classified or unclassified electronic documents outside their secure network. These needs cover both electronic mail (e-mail) facilities and transmission of other documents, such as word processor documents. Because of the secure, and generally classified, nature of the source networks, even the relatively simple case of e-mail requires unique handling routines to be applied, in a trusted manner, before the information can be allowed to leave the secure network.

In particular, information leaving a secure network must be checked to ensure that no unintended or covert information has been included within it. Most secure networks are comprised of untrusted computer devices, which cannot be relied upon to not include such covert information within a message to be released. Rather than replacing these untrusted computer devices with trusted devices, very few of which exist and those which do being expensive and having limited functionality, it is preferable to perform the required trusted checks with the aid of separate trusted devices which can be added into the existing network.

The current invention describes a pair of trusted devices, which can be fitted to an existing network comprising untrusted computer devices, to provide the means for a secure interconnection method between computer networks.

In an aspect of the invention, a method of handling a message or document having a body and header portions for transmission external of a secure computer environment, comprising the steps of:

(a) directing said message or document to a trusted sealing device, (b) said trusted sealing device displaying said message or document in a trusted manner to a human user for visual checking, and if acceptable to said human user, associating said displayed message or document with a seal produced by said trusted sealing device, (c) directing said message or document and said associated seal to a gateway which deletes all but predetermined portions of said header, said gateway further comprising a trusted verification means for checking the validity of said associated seal, and if and only if said associated seal is validly associated with said message or document, attaching predetermined header portions to said message or document and communicating said message or document from said secure computer environment.

These and other aspects of the invention will be apparent from the following description of preferred embodiments which, it will be understood, are illustrative only, and need not limit the invention to any one or combination of the following elements or features.

BRIEF DESCRIPTION OF THE FIGURES

In order that the invention may be more clearly understood, reference will now be made to the accompanying drawings, wherein.

DETAILED DESCRIPTION

Figure 1:
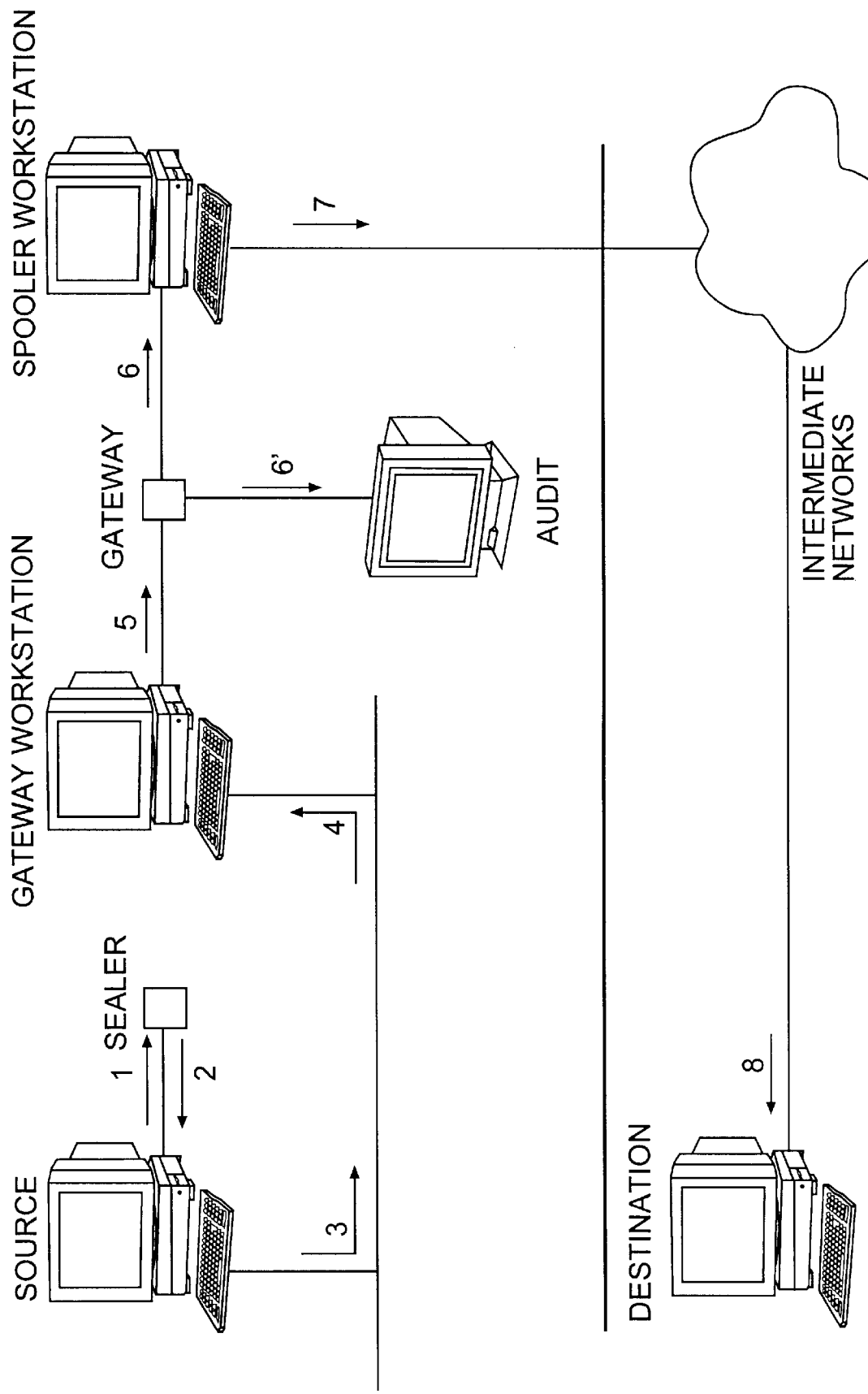
FIG. 1 depicts a schematic of the path of a mail message from its source to its destination.

Electronic mail (e-mail) is a standard feature of untrusted computer devices used in many computer networks. It is reasonable to expect that such mail will be freely exchanged between users within a computer network. In the case of a secure network comprising a collection of trusted and untrusted computer devices, however, potential security problems arise when there is a need to send e-mail outside of the secure network, either to the outside computer environment or via special communication channels to other secure computer networks. In cases where such connections are implemented, a check needs to be implemented on the outgoing link to ensure that only appropriately authorised information is released. This can be implemented by a gateway, which would typically be a dedicated computer device but may alternatively be a dedicated program resident in a multipurpose computer device.

Security problems may be precipitated anywhere along the e-mail path by software or hardware, potentially resident in the untrusted computer devices of the secure network, which may add covert or overt information to the e-mail, change the classification of information or otherwise attempt to compromise the security of the secure computer network.

Consider, for example, a mail routing configuration file which has been either:

(a) surreptitiously or otherwise adjusted so as to send e-mail messages directly to the gateway, without first obtaining appropriate export authorisations; or which has been maliciously amended so that (b) it adds an unauthorised or unexpected e-mail header in the message; or (c) it adjusts or adds information to expected e-mail headers; or (d) it modifies the message itself.

The most basic barrier to unauthorised information leaving the network is to have the gateway check, in a sufficiently trustworthy fashion, for the presence of an electronic data-like seal on each message received. Without a seal, the message is not passed, and furthermore the message is audited to determine its prior path and source. This basic barrier suffices to circumvent wayward configuration files as would be expected in circumstance (a) above.

In order for even this basic barrier to be effective, the seal associated with a message must represent a legitimate authority for that message to leave the secure network. The most desirable way to achieve this is to have an authorised human view the message, and once they are satisfied with its contents, to create the seal and attach it to the message. The seal may be created by a dedicated computer device or by a program on a multipurpose computer device. Highly desirable properties of the seal are that it should not be possible to forge a seal (i.e. an unauthorised user cannot create a valid seal for a message) and that the seal should be uniquely identifiable with a particular message (i.e. changes to the message should invalidate any existing seal). In many cases, it will be found that the author or originator of the information is a suitable human to authorise its release from the secure network.

Some mail transport mechanisms, for example the Unix "sendmail" program, add one or more headers to each message they process, and it is generally unreasonable to expect a human to be able to verify these headers (e.g. the internal message ID number used by the transport mechanism). In order to prevent the malicious signalling of information through such headers, only those headers which are required on the message and verifiable by a human are accepted. All other headers are removed from the message before processing by either the seal creation or the gateway function.

This is possible since the deleted information was generated by the transport mechanism in the first place, so a fresh set can be generated if and when the message is passed back to the transport mechanism after processing.

The removal of all but a few predefined headers also serves to eliminate the threat posed by the addition of unauthorised or unexpected headers to the message, as identified at (b) above. Addition of headers not of the allowed set will be detected by the visual inspection process conducted as a matter of course by the releasing officer prior to creating the seal for the message. As discussed above, even modification of the message headers after the seal is created, should invalidate the seal, and the message will thus be rejected at the gateway before it can leave the secure network.

The visual inspection process must preferably detect adjusted or additional information of the nature identified in (c) and (d) above. This is aided by presenting to the releasing officer only those headers which are necessary for correct message delivery and contain easily verifiable information. Again, modifications done after seal creation will invalidate the legitimacy of the seal associated with that message and prevent the message leaving the secure network.

There are, of course, more sophisticated covert information secretion techniques. However, generally speaking, these are also easily circumvented by limiting e-mail messages to pure text form, as opposed to "complex" documents (i.e. those which contain non-textual information and/or representational structure, such as a word-processor document) which typically provide much more fertile ground for the secretion of covert information.

It is important to recognise that this discussion is related to means and methods of combating software and hardware covert information creations, and does not deal with the obvious breaches of security which a wayward operator, with adequate clearance, may impose on a highly classified or secure network.

Consider now an error in the various connection programs resident in the untrusted source computer or the untrusted components of the gateway which may:

(a) not pass the message to the appropriate device(s) to have a seal attached; or (b) pass incorrect or unauthorised seals with messages directed to the gateway; or (c) not eliminate all but a predetermined set of headers from the message, in effect leaving certain potentially security threatening headers in the message.

In the case of (a), as in prior instances, the most basic barrier mechanism of the gateway fails to pass the message on, since it will not have an acceptable seal attached to it. Such messages will be audited and then discarded.

In the instance (b), where part of the seal is altered after it is created or a new seal which has not been properly calculated is associated with the message, the basic gateway barrier will detect that the seal does not correspond to the message, and again invoke the error and audit procedures.

In the third instance, (c) above, when headers for one reason or another are not correctly stripped between message creation and display, the onus is on the human operator to check the veracity and authenticity of the message they are visually checking. Furthermore, headers not included in the process of sealing by the operator are liable to be identified by the basic barrier at the gateway, since the process of checking the seal will reveal that the seal is not correct for the message.

It will be seen that the following methods and means are designed to accommodate the circumstances described above as well as others which will become apparent.

Although the basic gateway barrier (seal verification means) and its reciprocal sealing device (seal creation means) have been designed to be a generic module capable of monitoring many types of information transmission, we describe herein the issues associated with text-only electronic mail and in particular describe an embodiment which is applicable to a Sun SPARCstation platform employing the sendmail mail transport mechanism.

This document contains functional descriptions of both gateway and sealing devices.

FIG. 1 shows the physical path of an e-mail message through a system, beginning at the user's machine (source) and ending at the message's destination address (destination). When the user at the source machine sends a message to an address outside the secure network, instead of being immediately forwarded to the gateway it is diverted to a trusted sealing device which is attached to the source machine (1). The trusted sealing device displays the message in a trusted manner on the source machine's screen, and the user must visually verify that the contents of the message have not been altered in any way. If the user accepts the message as displayed, the sealing device calculates a tamper proof seal for the message, which is returned to the source machine with the message (2). The source machine then routes the message and its seal to the gateway (3, 4).

The gateway passes the message and its seal to the seal verification means (5) which recalculates the seal for the message as provided. The newly created seal is then compared with the supplied seal. If the two seals differ, a copy of the message may be passed to auditing facilities (6') and there is likely no further processing of the message, although the message could be returned to its author. If the two seals are identical, the message is allowed to continue to the outside network (6), where the mail spooler processes the message and passes it to the usual mail delivery facilities (7) which forward the message through any required intermediate network(s) to the required destination network. Even in this case, a copy of some or all of the message and/or its seal may also be passed to the auditing facilities (6') to form part of the system audit trail.

As will be appreciated, the only trusted devices in the above processes are the sealing device and the seal verification means. The method required to allow export of data from the secure network preferably incorporates untrusted method steps additional to the typical e-mail handling procedures of the standard untrusted computer network. When appropriately used in conjunction with the trusted functionality of the trusted sealing device and trusted seal verification means, acceptable security for the export of e-mail from the source secure network is provided.

Figure 2:
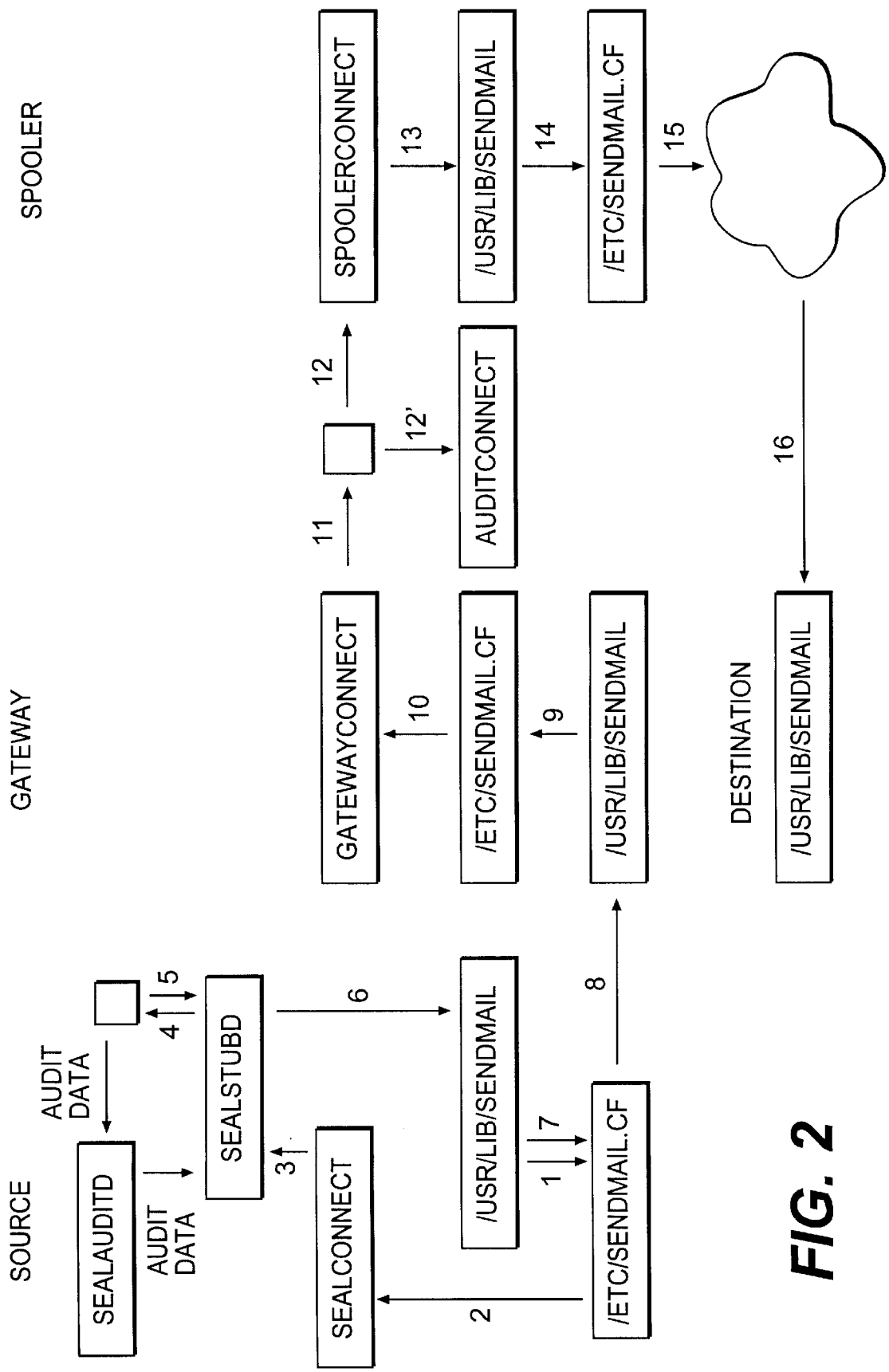
FIG. 2 depicts the array of software modules which handle the mail message in the source network and beyond.

FIG. 2 shows the software modules which handle the e-mail message. The user at the source workstation constructs and sends a message in the normal way. The user's mailtool then passes the message to the sendmail program for delivery. The sendmail program uses information contained in its configuration file (/etc/sendmail.cf) to process the message, carry out any required address rewriting and route (1) the message appropriately for its destination.

Local mail (i.e. mail with a destination address within the secure network) is delivered normally, without any use of the trusted sealing device. Mail to any external network, however, is input into a program called sealconnect (2), which interacts with the trusted sealing device daemon (sealstubd) which must be running in the background on the user's workstation.

Sealconnect passes the message to the trusted sealing device daemon, which then forwards the message, possibly along with some extra information such as a serial number, to the trusted sealing device (4). The trusted sealing device displays the message on the user's display, allowing the user to visually inspect the message and satisfy themselves that no alterations have been made to the message. Once satisfied of this, the user activates a trusted input into the sealing device, which then calculates the correct seal for the message and returns the seal, possibly along with some additional information, to sealstubd (5). Sealstubd passes the message back to sendmail (6) for further processing and routing (7).

Sendmail must have some means of determining that the message has already been sealed. One possible implementation is to have sendmail detect the presence of the seal (e.g. by including the seal as extra headers added to the existing ones), while another is to add a marker to the message's destination address before it was sent to sealconnect. Such a marker may need to be removed before the message leaves the secure network, so as to allow for correct delivery and seal verification.

Having determined that the message has indeed been sealed, sendmail routes the message (8) through to the appropriate gateway out of the secure network. The sendmail program on the gateway workstation invokes the seal verification means connect program (gatewayconnect) which passes the message to the seal verification mean s for verification and validation of the seal (11) which indicated that the e-mail message is the same as that sealed by the user and the seal is correctly associated with that e-mail message. When the seal is validated, the message is passed to the external gateway, or spooler machine (12). The marker, which indicates to sendmail that a message has already been sent to the trusted sealing device which has calculated and associated a seal for this message, may preferably be removed and the message forwarded to its final destination. The use of a marker is an optional indication means since the presence of a seal achieves the same effect if need be.

If the seal is found to be invalid by the seal verification means, the message and any associated information may be passed to the network message auditing means (12'), or it may be returned to the author. It is to be noted that the description of this embodiment does not include any of the header stripping or other steps required to ensure that a sealed message remains verifiable.

Sendmail Configuration Files

For quick reference, the metasymbols for the left hand side of sendmail rewrite rules are:

| | | |
|---|---|---|
| . | $* | Match zero or more tokens |
| . | $+ | Match one or more tokens |
| . | $- | Match exactly one token |
| . | $=x | Match any string class in x |
| . | $~x | Match any token not in class x |
| . | $%x | Match any token in NIS map $x |
| . | $!x | Match any token not in NIS map $x |
| . | $x | Match macro x |

Source Machine

The configuration file on the source machine is responsible for determining which messages should be passed to the trusted sealing device and which messages should be sent directly to the mail system. The configuration file examines the recipient address of a given mail message to determine if the message is local or needs to be forwarded to an external network. If the message is local, the message is sent as usual. Messages with non-local addresses which have not already been sealed are passed to the trusted sealing device interface.

The configuration file follows the usual rewrite rules defined for the local system. There need not be any changes to these rules, as they just adjust the various forms of addressing to a canonical form. After all rewriting has taken place, the address is checked to see if it is local or not. Local addresses have the string "local" inserted into the recipient address or consist of just a username (i.e. $+), and anything else is assumed to be a non-local address. All non-local mail must be sealed by a trusted sealing device and then have its seal verified at the verification means.

If the address is identified as non-local, a standard configuration file will send the message via the ethernet mailer to the gateway. However, an alternative mailer called the trusted sealing device mailer can be used. This receives all non-local mail needing a seal. The following shows a message being redirected to the trusted sealing device mailer:

| | | | | |
|---|---|---|---|---|
| R$*<@$+>$* | $#stub | $@$2 | $:$1@$2$3 | (*) |
| R$*@$* | $#stub | $@$2 | $:$1@$2 | (**) |

Any recipient address matching the left hand side has the right hand side rewrite rule applied to it. The syntax of the right hand side is $#mailer$@host$:user. For example, an input address lmn@itd.dsto would match the left hand side of the second rule and be sent to the trusted sealing device mailer with host @itd.dsto and user lmn@itd.dsto. The specification for the trusted sealing device mailer is as follows:

Mstub, P=/foo/bar/sealconnect, F=sDFMuX, S=17, R=27, A=sealconnect -r $u

The P field indicates the pathname of the mailer.

The F field indicates mailer flags. There are no specific requirements defined here for the trusted sealing device. The specified flag are typical of many mailer interfaces.

S=17 indicates that the address of the sender of the message must be passed through the rewriting rule S17. The macro J is expanded as the address of the sender.

```
S17
R$*<@$+>$*              $@$1<@$2>$3
R$+                     $@$1<@$J>
```

R=27 indicates that the address of the recipient of the message must be passed through the rewriting rule S27.

Before the message is sent to the trusted sealing device mailer, the recipient address is adjusted to include a flag indicating that the message has been identified as one which needs a seal and has been forwarded to the trusted sealing device. This rule inserts a string defined by the macro T into the recipient address to indicate that the message has passed through the trusted sealing device mailer. In this implementation, T defines the string "tcs_customs". The address in the above example would, again, match the second rule and the final form of the recipient address would be "lmn@itd.dsto.tcs_customs".

```
S27
R$*<@$+>$*              $@$1<@$2.$T>$3
R$*@$*                  $@$1@$2.$T
```

After processing by the trusted sealing device, the mail message is returned to the sendmail program on the source machine. The configuration file will again recognise the recipient address as "foreign" and, if not for the flag inserted into the address in the previous step, the message would be forwarded to the trusted sealing device again. Prior to the call to the trusted sealing device mailer (as previously discussed), there is a rule which checks recipient addresses for the expansion of the T macro.

```
R$*<@$*.$T>$*     $#$M    $@$R    $:$1<@$2.$T>$3
R$*@$*$T          $#$M    $@$R    $:$1@$2$T
```

The macros M and R are defined as the ethernet mailer and the mailhost respectively, so any recipient address matching the rewrite rule on the left hand side will be sent via the ethernet mailer to the mailhost machine. The ethernet mailer specification needs no adjustment since the vendor supplied default performs as required for transmission of the mail message to the gateway.

Gateway

In a similar manner to the configuration file on the source machine, the configuration file on the gateway is required to distinguish between non-local addresses, which need to be sent via the seal verification means, and local addresses, which are sent as usual. This is achieved in the same way as on the source machine. All non-local addresses are checked for the T macro expansion. If this is present, the message is sent to the seal verification means interface via the trusted sealing device mailer. If the T macro is not found, processing continues until all local rewrite rules have been checked. If at this point the message still hasn't been delivered the message is probably a non-local message which was not correctly sealed. This type of message is sent to the gateway and from there can be directed to the auditing means. However, it could instead be sent back to its originator for reprocessing. In any event, a message containing anomalies which arrives at the seal verification means without a correct (or indeed any) seal will be refused exit permission, and audit facilities will be invoked.

The gateway configuration file identifies all recipient addresses which contain the macro T at the end of the address of the recipient. These messages are redirected to the seal verification mailer as shown in the following rule:

```
R$*<@$*.$T>$*   $#gatewaystub   $@$2   $:$1@$2.$T$3   (§)
R$*@$*.$T       $#gatewaystub   $@$2   $:$1@$2$T      (§§)
```

The gateway seal verification mailer is defined as follows:
Mgatewaystub, P=/foo/bar/gatewayconnect, F=sDFMuX, S=17, R=27, A=gatewayconnect -r$u

```
S17
R$*<@$+>$*              $@$1<@2>$3
R$+                     $@$1<@$J>
```

R=27 indicates that the address of the recipient of the message must be passed through the rewriting rule S27. In this case, the rewriting rule for the recipient makes no change to the address other than removing angle brackets if any appear.

```
S27
R$*<@$+>$*              $@$1@$2$3
R$*@$*                  $@$1@$2
```

Non-local messages with no T macro in the recipient address are sent to the seal verification means by the following rewrite rules:

```
R$*<@$+>$*   $#gatewaystub   $@$2   $:$1@$2$3   (†)
R$*@$*       $#gatewaystub   $@$2   $:$1@$2     (††)
```

It should be noted that any messages which are not "caught" by these rules and forwarded to the seal verification means, but are addressed to a machine on the external network, will be flagged by the error mailer, as a local machine fitting the address of the message will not be found. If sendmail should try to send a message to the external network, it must be sent via the seal verification means, as this is the only physical connection to the external network.

The gateway workstation could also be used as a source machine, provided the changes described above for the source machine were included in the configuration file of the gateway.

However, (†) and (††) would need to be replaced by (*) and (**) respectively.

Spooler Machine

The function of the sendmail configuration file on the spooler machine is to restore the address of the recipient to its original state. The "tcs_customs" string which is inserted by the source machine is removed so the message can be placed in the mail system and be delivered as usual. This is achieved by a single rewrite rule as follows:

```
R$*@$*.$T$*             $1@$2$3
```

This rewrite rule should be carried out before any other rewriting of the address occurs.

Clearly there is no sense in using the spooler machine to compose and send mail via trusted sealing device or seal verification means since the spooler is itself external to the secured source network and hence may be under a different security policy to the secured source network.

The spooler machine needs only to be capable of running UNIX mailing facilities.

Connection Software

Connection software is the term used for the software interface between (a) either the trusted sealing device or seal verification means and (b) the mail system software.

Trusted Sealing Device Software

Figure 4:
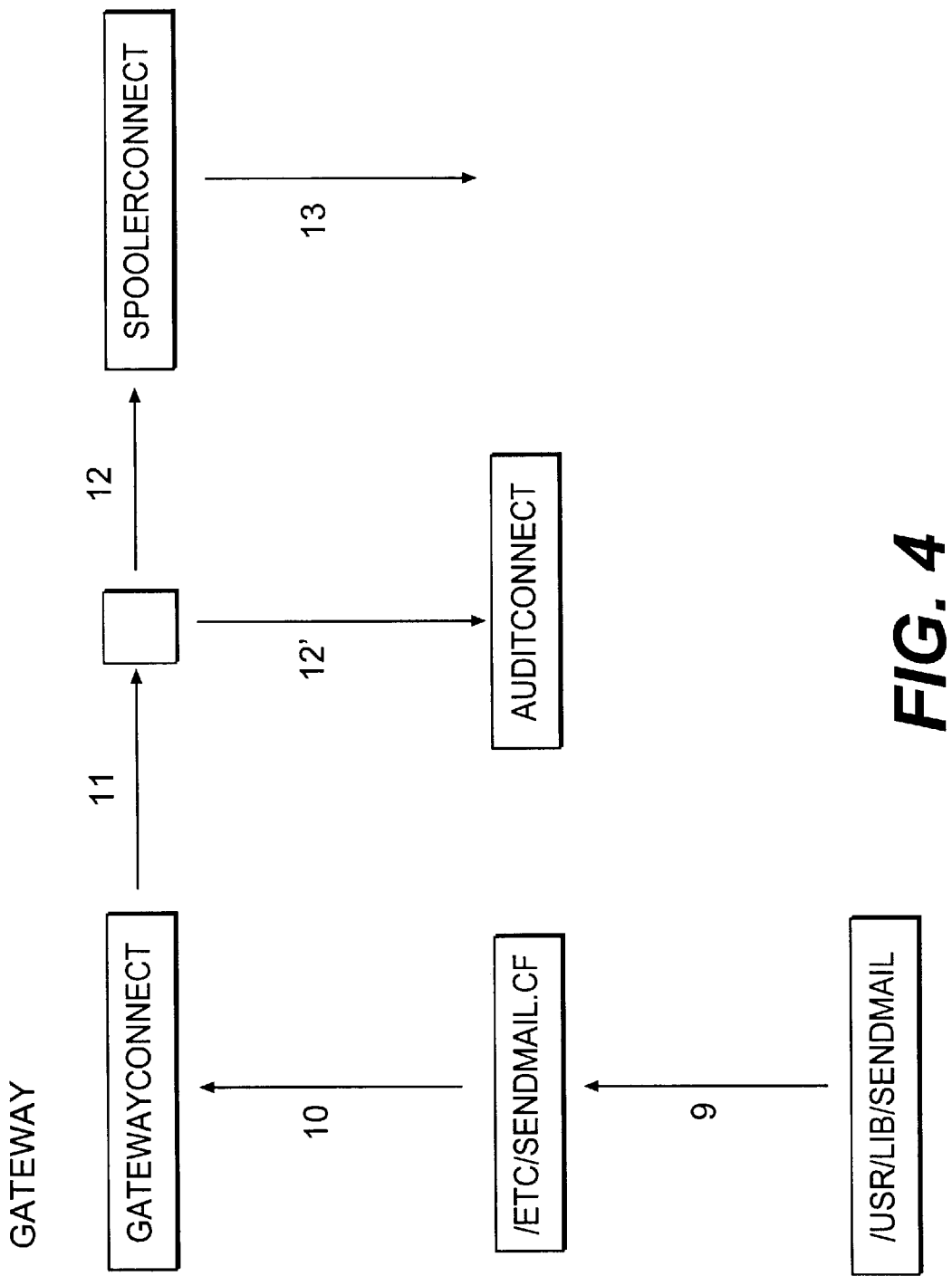
FIG. 4 depicts the array of software modules which handle the sealed mail message in the gateway of the source network.

The software modules involved in providing a unique path for a sealed and to-be-sealed mail message are shown in FIG. 4.

Trusted Sealing Device Daemon

The interface to the trusted sealing device is a software module called sealstubd, which runs in the background and deals with:

1. mail messages arriving from sendmail via the sealconnect software module (3);
2. communication to and from the trusted sealing device (4)(5); and
3. audit data arriving from sealauditd.

When sealstubd starts, it establishes a means of communication with the trusted sealing device, sealauditd and sealconnect processes. Sealstubd communicates with the trusted sealing device via the serial port and, upon start-up, opens a non-blocking, read/write connection with the serial port. To communicate with the sealauditd and the sealconnect processes it also creates two UNIX domain stream socket connections. After the communication channels have been successfully established, sealstubd waits for any communication over these channels.

Sealstubd checks for any attempted connections to the sealconnect socket for messages to be sealed. If data is found on the socket, sealstubd checks the sealauditd socket to make sure no auditable actions have occurred. When audit data (if any) has been processed and, if there were no shutdowns, as may be provided for by actuation of a predetermined switch on the trusted sealing device indicating such an action, the message is read in until an EOF marker in the e-mail is found. Certain headers are not to be passed onto the trusted sealing device due to the difficulty in visual verification and the necessity to maintain consistency between separate passes through sendmail, so sealstubd checks for an allowed set of headers and removes all others from the message. Sealstubd then obtains a serial number from a file and passes the serial number, message length and message to the trusted sealing device via the serial port in the following order:

1. one byte indicating trusted sealing device communication (an ascii character),
2. serial number (five, eight digit hex numbers),
3. message length (an eight digit hex number) and
4. message.

A flag is set at this point to indicate that sealstubd is not to receive any further communications over the sealconnect socket until the trusted sealing device has completed processing of the current message. When this flag is set, sealstubd alternately checks the serial port for the resulting seal and the sealauditd socket for incoming audit data.

After the trusted sealing device has calculated the seal, it returns the classification which has been selected by the user, the calculated seal and the time the seal was calculated to sealstubd, which then inserts this information, along with the serial number, into the mail message as part of the header and passes the adjusted message back to sendmail.

The headers which may be inserted into the message are:

X-Seal: A 32 digit hexadecimal number

X-Label: A user defined classification, represented by an 8 digit hexadecimal number X-SerialNo: The current serial number, represented by a 40 digit hexadecimal number X-Time: The time the message was sealed, represented by two 8 digit hexadecimal numbers However, some condition may have occurred to prohibit the trusted sealing device from sending the seal to sealstubd. This could happen if:

1. the user decides that the message is incorrect or he/she no longer wants to send the message and, accordingly, actuates a predetermined switch on the trusted sealing device to reject the message; or
2. the serial number is incorrect; or
3. the trusted sealing device has reset; or
4. the trusted sealing device has shut down.

In any of these circumstances, the audit data is sent from sealauditd to sealstubd, and sealstubd takes appropriate action. In case 1, 2 or 3, sealstubd resets the flag to indicate that it is no longer currently processing a message. In case 4, sealstubd exits with exit status SEALDEVICESHUTDOWN.

However, if no data is found on the sealconnect socket, sealstubd will alternately check the sealauditd socket and the sealconnect socket for any incoming audit data.

Mail Headers

As previously discussed, mail headers need to be handled in a specific manner.

Mail headers are defined in the sendmail.cf file in the following way:

H[?mflags?]hname:htemplate

If the htemplate macro expansion is empty, the header is not included in the mail message. If the mflags are specified, the mailer invoked must specify at least one of these special flags for the header to be included. Any header already included in the input of a message is automatically output.

The set of possible headers that can be inserted into a mail message is therefore dependent on the local network. The operative set of headers is usually decided upon when the mailing system is set up and would rarely be adjusted at a later stage. However, there seems to be an unofficial set of standard headers which does not vary much between networks. There are three special header lines which have their definitions built into sendmail and cannot be changed without changing the sendmail code. They are:

Return-Receipt-To: A message will be sent to any specified names when the final delivery is complete Errors-To: Errors will be sent to listed names rather than to the sender To: Recipient address A problem which has been encountered is that some headers contain information that, when displayed for inspection, cannot be verified by the user as being correct. All headers which are considered impossible or too difficult to verify by inspection must be stripped from the mail message by the sealstubd program. All headers which contain the macros c—the hop count, i—the queue ID, p—sendmail's process ID or t—a numeric representation of the time, are not included in the mail header. In the configuration file of the present embodiment these are found to be Message-Id and Resent-Message-ID. For example, the Message-Id header is defined as:

H?M?Message-Id:<$t.$i@$j>

The macros used above are defined as:

t a numeric representation of the current time i the queue ID j the official domain name for this site The following is a Message-Id header taken from a mail message:

Message-Id: 9206050726. AA0178Z@tcs21.dsto.oz

As can be seen, this could not be checked easily by visual inspection.

Figure 3:
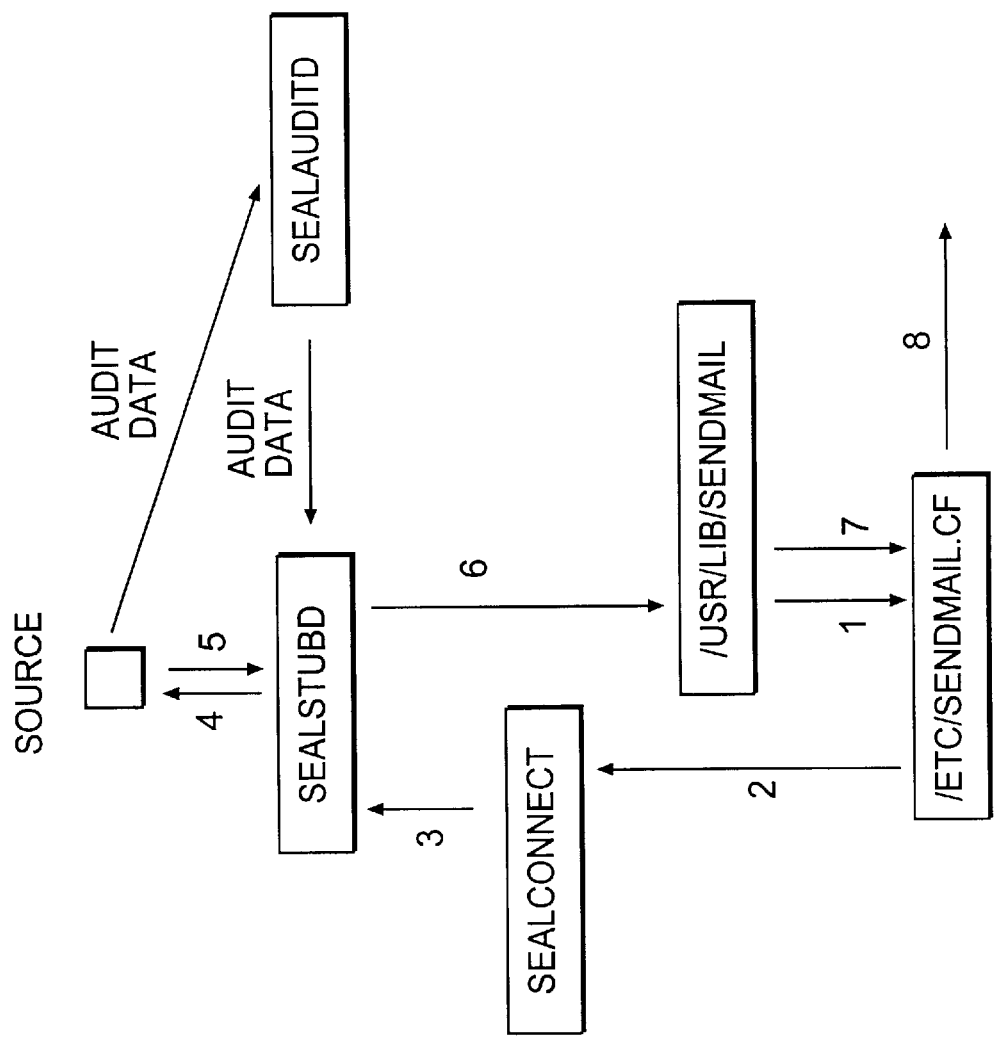
FIG. 3 depicts the array of software modules which handle the mail message in the source computer as it is sealed and sent into the source network.

The second problem encountered is headers which contain fluid information. For example, consider the UNIX-style "From" line at the front of the message which contains the sender's surname, date, and the time the message was sent. This is prepended to the message each time it is received by sendmail. This occurs at steps (1) and (7) in FIG. 3. When the message arrives at the seal verification means, the seal is recalculated using the new "From" header line. This will give a different seal from the originally calculated seal, as the times in the two "From" header lines will be different, causing every message to be rejected at the gateway. This problem has been solved by stripping the "From" header line from the message by the sealconnect program.

Alternatively, a flag in the mailer definition for the trusted seal device mailer can be inserted, which will indicate that this header is not required; However, it preferable to retain the UNIX-style "From" header flag for the purposes of retaining this header for local mail.

Headers which fit into either of the above categories of problem are the UNIX-style "From" header, "Message-ID:", "Resent-Message-ID:", "Resent-From:", "Received:" and "Resent-Date:".

The sealstubd program module operates on the basis of checking for headers which are allowed and rejecting all others. The sendmail configuration file will need to be checked to make sure neither of the above problems will be encountered with the headers we have chosen to be acceptable. The headers which are currently accepted by the connect module are "To:", "From:", "Cc:", "Date:", "Return-Path:" and "Subject:". Note also that the number of header lines which appear in the header should be kept at a minimum to encourage the user to be effective in checking the headers. If too many headers remain in the message, the operator may become weary of checking too much superfluous information.

Trusted Sealing Device Connect

The sendmail configuration file specifies that the module (sealconnect) is to be invoked when mail requiring a seal is received. Sealconnect is invoked with the mail message sent to its standard input. Sealconnect first tries to open a connection to the sealstubd socket. If sealstubd is currently processing a message, the socket connection will be made but no data read from the socket by sealstubd until processing of the current message is completed or cancelled. The mail message is then read in, line by line, by sealconnect and placed on the socket to be read by sealstubd. NOTE: Sealconnect is necessary as an intermediary, since sendmail invokes its mailer as a new process, with the message being provided as standard input. Since sealstubd is a perpetually running process, output from sendmail could not be passed to it in this manner.

Trusted Sealing Device Audit Daemon

The trusted sealing device audit daemon (sealauditd) opens a connection to the audit serial port and waits for any audit messages from the trusted sealing device. When an audit message is received sealauditd stores the message in an audit file. The sealstubd also needs to know of any audit messages so a socket connection is made, allowing any audit messages to be passed to sealstubd also.

The current list of possible audit messages and their meanings is:

1. 'm'—message rejected,
2. 'k'—ksp error,
3. 'd'—shutdown request and
4. 'i'—seal verification means initialised.

Seal Verification Software Including Originating Network to Sealing Device and Verifying Means As depicted in FIG. 4, the interface from the originating network to the seal verifying means is a software module called gatewayconnect. The sendmail configuration file specifies that this module is to be invoked, when mail which has already been sealed is received. Gatewayconnect is invoked with the mail message sent to its standard input.

Gatewayconnect establishes communication with the serial port used for communication with the seal verification means, which reads the mail message from standard input and adjusts the headers, as previously described. The gatewayconnect module will also recognise the special seal headers that the sealstubd module has inserted (i.e., X-Seal, X-Label, X-SerialNo and X-Time). The unique marker may comprise X-Seal alone or include the others as well, but note, that they are then made part of the message which is sealed and must also be part of the message which is subsequently seal verified by the trusted seal verification means. The seal, label, time and serial number information is extracted and the corresponding headers removed from the message. This information is then passed to the trusted seal verification means in the following order:

1. one byte indicating seal verification communication (an ascii character),
2. serial number (five, eight digit hex numbers),
3. message length (an eight digit hex number),
4. message,
5. message label (one, eight digit hex number),
6. seal (four, eight digit hex numbers) and
7. seal time (two, eight digit hex numbers).

The seal is then recalculated by the seal verification means.

The seal verification means compares the newly calculated seal with the seal supplied with the mail message. If the seals do not match, audit facilities are invoked or the message is returned to the author, or both. Otherwise, the message is passed to the spooler machine for further processing and delivery.

When gatewayconnect has passed the message to the seal verification means the serial port connection is closed and the process terminates.

Seal Verification Means to Spooler

The interface from the seal verification means to the spooler machine is a software module called spoolerconnect. This process establishes a permanent connection with the seal verification means output serial port and waits for any communication. The message is received in raw form, i.e. with no seal headers inserted into the message (these should have been removed by gatewayconnect). The process then opens a pipe to /usr/lib/sendmail and pipes the message into the mail system.

The process should only terminate on receiving an error condition when opening a connection to the serial port. When it has finished processing a message, it continues to wait for further messages from the seal verification means.

Seal Verification Means to Audit

This gateway auditing daemon (gatewayaudit) is identical to spoolerconnect in that it is a permanent listening process waiting for communication over the serial port from the seal verification means. However, this module receives the serial, number along with the audit message. The module then generates an audit message, stores it and continues to listen for any communication from the seal verification means over the serial port.

The current list of possible audit messages and their meanings is:

1. 'm'—message rejected,
2. 'k'—ksp error,
3. 'd'—shutdown request,
4. 'i'—seal verification means initialised and
5. 'g'—seal verified.

Serial Port Routines

All communication over the serial port is done as hexadecimal characters. This was done to avoid any data that was sent being interpreted as control characters by the serial port.

The ser_init(s) routines take a device name as input and open a connection to the device. Flags are set to indicate baud rate and number of bits/transmission, and to enable the receiver. Five initialise routines exist: ser_init_rw_no-wait (s), ser_init_rw(s), ser_init_r_no_wait(s), ser_init_r(s), ser_init_w(s) denoting non-blocking read/write, blocking read/write, non-blocking read, blocking read only and blocking write only connections respectively.

ser_getc(c), ser_get(s), ser_putc(c), and ser_puts(s) deal with getting a character or string from the serial port or putting a character or string on the serial port respectively.

ser_putn(s, n) puts the first n characters of a string, s, onto the serial port.

Thus it can be seen that special handling is required if electronic mail is to be provided to users on secure computer networks wishing to exchange messages with external network users. However, it will be noted that the preceding discussion has not specifically addressed the issue of message content checking (as in covert information elimination) since, for pure text messages, such techniques will be relatively well known to the person skilled in the art.

We claim:

1. A method of handling a message or document having a body and header portions for transmission external of a secure computer environment, comprising the steps of:
   (a) directing said message or document to a trusted sealing device,
   (b) said trusted sealing device displaying said message or document in a trusted manner to a human user for visual checking, and if acceptable to said human user, associating said displayed message or document with a seal produced by said trusted sealing device,
   (c) directing said message or document and said associated seal to a gateway which deletes all but predetermined portions of said header, said gateway further comprising a trusted verification means for checking the validity of said associated seal, and if and only if said associated seal is validly associated with said message or document, attaching predetermined header portions to said message or document and communicating said message or document from said secure computer environment.

2. The method according to claim 1, wherein said message or document is communicated from said secure computer environment along with said associated seal.

3. The method according to claim 1, wherein step (b) further comprises the step of appending to said seal and message or document further header portions following the association of a seal with said displayed message or document.

4. The method according to claim 3, wherein a said further header portion appended to said message or document comprises said seal.

5. The method according to claim 3, wherein a said further header portion to said message or document is a marker used to direct said message or document to said trusted sealing device within said secure network and wherein step (c) further comprises removing said marker prior to communicating said message or document from said secure network.

6. The method according to claim 1, and comprising the further step of copying at least part of said message or document and said associated seal and directing said copies to a network message auditing means whether or not said associated seal is validly associated with said message or document.

7. The method according to claim 1, and comprising the further step of copying at least a portion of said message or document and directing said copy to a network message auditing means after step (c).

8. The method according to claim 1, wherein step (b) further comprises the step of appending to said seal and message or document further header portions after display and before sealing said message or document.

9. The method according to claim 3, wherein a said further header portion comprises a user determined message or document security classification.

10. The method according to claim 1, wherein step (b) further comprises the step of appending to said seal and message or document further header portions prior to displaying said message or document.

11. The method according to claim 10, wherein said further header portion comprises a serial number provided by said sealing device to identify said message or document.

12. The method according to claim 10, wherein said further header portion comprises the time said message or document was viewed provided by said sealing device.

* * * * *